United States Patent
Tanaka et al.

(10) Patent No.: US 10,569,616 B2
(45) Date of Patent: Feb. 25, 2020

(54) VEHICLE SEAT AIR-CONDITIONING DEVICE

(71) Applicant: DENSO CORPORATION, Kariya, Aichi-pref (JP)

(72) Inventors: Yuusuke Tanaka, Kariya (JP); Yasuhiko Niimi, Kariya (JP); Takahisa Fujii, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 26 days.

(21) Appl. No.: 15/030,667

(22) PCT Filed: Oct. 14, 2014

(86) PCT No.: PCT/JP2014/005199
§ 371 (c)(1),
(2) Date: Apr. 20, 2016

(87) PCT Pub. No.: WO2015/059895
PCT Pub. Date: Apr. 30, 2015

(65) Prior Publication Data
US 2016/0272038 A1    Sep. 22, 2016

(30) Foreign Application Priority Data
Oct. 25, 2013   (JP) .................... 2013-222119

(51) Int. Cl.
  *B60H 1/00* (2006.01)
  *B60N 2/56* (2006.01)
(52) U.S. Cl.
  CPC ..... *B60H 1/00285* (2013.01); *B60H 1/00742* (2013.01); *B60H 1/00871* (2013.01);
(Continued)

(58) Field of Classification Search
  CPC ............ B60H 1/00285; B60H 1/00742; B60H 1/00871; B60H 2001/00128; B60H 2001/003; B60N 2/56; B60N 2/5657
  (Continued)

(56) References Cited

U.S. PATENT DOCUMENTS 6,793,016 B2 * 9/2004 Aoki .................. B60H 1/00285
                                                              165/202
9,162,769 B2 * 10/2015 Rauh ..................... B64D 13/00
(Continued)

FOREIGN PATENT DOCUMENTS

DE      102005014526 A1    10/2006
DE      102011106967 A1     1/2013
(Continued)

OTHER PUBLICATIONS

Mizobata, Hiroshi, JP2010142274 Translation.pdf, "Vehicle seat", Jul. 2010, pp. 1-18.*

*Primary Examiner* — Vivek K Shirsat
*Assistant Examiner* — Ryan L Faulkner
(74) *Attorney, Agent, or Firm* — Harness, Dickey & Pierce, P.L.C.

(57) ABSTRACT

A seat air-conditioning device is provided with an air blowout portion which is open so as to blow out air toward a seated occupant seated on a vehicle seat, the air being blown from a ventilator. A control device of the seat air-conditioning device causes a blowing direction changing device to change a blowing direction of the air blown our from the air blowout portion based on passenger information including a build and a sitting position of a passenger which is the seated occupant. Accordingly, air can be blown in a direction according to the build or the sitting position of the seated occupant.

14 Claims, 7 Drawing Sheets

(52) U.S. Cl.
CPC ............. *B60N 2/56* (2013.01); *B60N 2/5657* (2013.01); *B60H 2001/003* (2013.01); *B60H 2001/00128* (2013.01)

(58) Field of Classification Search
USPC .......................................................... 454/75
See application file for complete search history.

(56) References Cited

U.S. PATENT DOCUMENTS

2008/0191856 A1   8/2008  Hetzenecker et al.
2010/0314071 A1  12/2010  Lee et al.

FOREIGN PATENT DOCUMENTS

| | | |
|---|---|---|
| EP | 1950084 A1 | 7/2008 |
| FR | 2905092 A1 | 2/2008 |
| JP | 2003011639 A | 1/2003 |
| JP | 2006137362 A | 6/2006 |
| JP | 2007176238 A | 7/2007 |
| JP | 2010142274 A | 7/2010 |
| JP | 4962425 B2 | 6/2012 |

\* cited by examiner

VEHICLE SEAT AIR-CONDITIONING DEVICE

CROSS-REFERENCE TO RELATED APPLICATIONS

This application is a U.S. National Phase Application under 35 U.S.C. 371 of International Application No. PCT/JP2014/005199 filed on Oct. 14, 2014 and published in Japanese as WO 2015/059895 A1 on Apr. 30, 2015. This application is based on and claims the benefit of priority from Japanese patent application No. 2013-222119 filed on Oct. 25, 2013. The entire disclosures of all of the above applications are incorporated herein by reference.

TECHNICAL FIELD

The present disclosure relates to a vehicle seat air-conditioning device that blows out conditioned air in a vehicle seat.

BACKGROUND ART

As a conventional technology related to vehicle seat air-conditioning devices, for example there is the device disclosed in Patent Literature 1. A vehicle seat air-conditioning device of Patent Literature 1 includes an air-conditioning device formed of a ventilator and a heat exchanger disposed in a vehicle seat, a camera that photographs a seated occupant who is a passenger sitting in the vehicle seat, and a controller that controls the air-conditioning device.

Then, the controller sets the operation of the air-conditioning device to a normal mode when the size of the body of the passenger, which is obtained based on an image of the camera, is less than a reference value. Conversely, the controller sets the operation of the air-conditioning device to a limited mode, in which the operating output is limited as compared to the normal mode, when the size of the body of the passenger is at or above the reference value.

PRIOR ART LITERATURE

Patent Literature

Patent Literature 1: JP 4962425 B

SUMMARY OF THE INVENTION

In Patent Literature 1, a technique is described in which the air-conditioning capacity of a vehicle seat air-conditioning device is changed based on a build which is the size of the body of a passenger. Here, if the build or the sitting position of the seated occupant changes, then the wind direction of blowout air that feels pleasant to the seat occupant also changes. Accordingly, when viewed from a point of improving the comfort of the seated occupant, it is contemplated that it would be preferable to be able to change the wind direction of the blowout air being blown toward the seat occupant, as opposed to having the wind direction of that blowout air be fixed. However, the vehicle seat air-conditioning device of Patent Literature 1 does not include an ability to change the wind direction of that blowout air.

In view of the above points, it is an object of the present disclosure to provide a vehicle seat air-conditioning device capable of blowing out air in a direction according to the build or sitting position of a seated occupant.

In a first aspect of the present disclosure, a vehicle seat air-conditioning device comprises a ventilator that blows air, an air blowout portion that is open so as to blow out the air blown by the ventilator toward a passenger sitting in a vehicle seat, a blowing direction changing portion disposed in the air blowout portion, the blowing direction changing portion changing a blowing direction of the air blown out from the air blowout portion, and a controller that causes the blowing direction changing portion to change the blowing direction based on passenger information including at least one of a build and a sitting position of the passenger.

According to the above described disclosure, the blowing direction of air blown form the air blowout portion is changed by the blowing direction changing portion based on the passenger information including at least one of the build and the sitting position of the passenger. Accordingly, air may be blown in a direction according to the build or the sitting position of the passenger.

EMBODIMENTS FOR CARRYING OUT INVENTION

Figure 1:
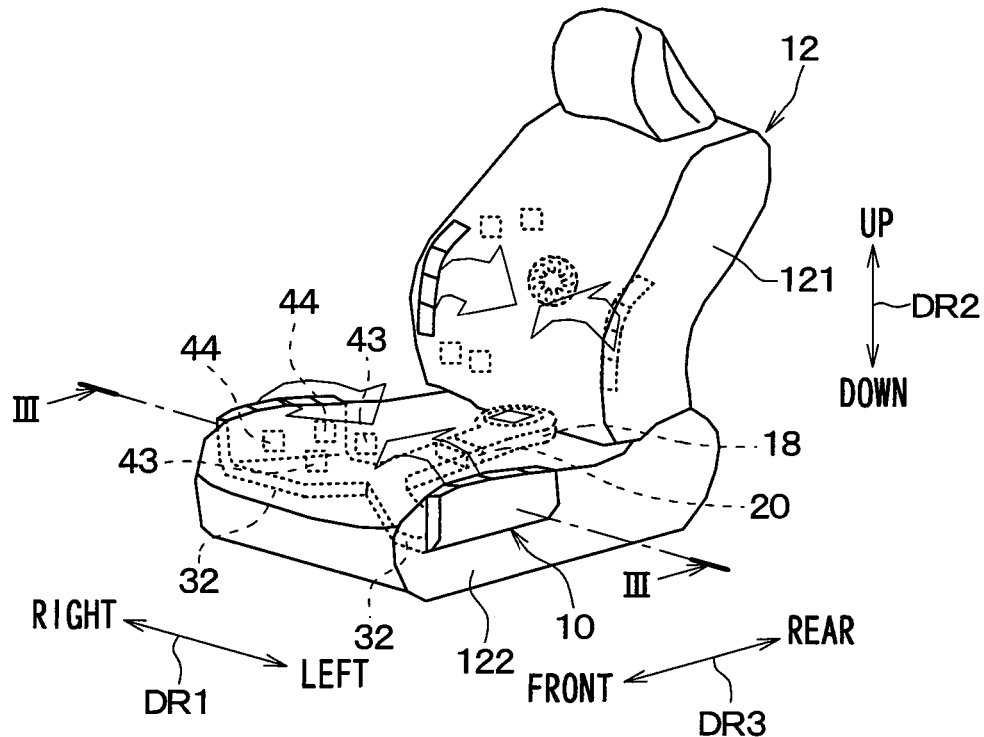
FIG. 1 is an outline perspective view showing a vehicle seat air-conditioning device of a first embodiment and a vehicle seat having that vehicle seat air-conditioning device installed.

Hereinafter, embodiments of the present disclosure will be explained with reference to the figures. Further, in each of the embodiments below, portions which are the same or equal to each other are denoted with the same reference numerals in the figures.

First Embodiment

FIG. 1 is an outline perspective view showing a vehicle seat air-conditioning device 10 of the present embodiment, and showing a vehicle seat 12 having the vehicle seat air-conditioning device 10 installed. Each of a seat back 121 and a seat cushion 122 of the vehicle seat 12 has a vehicle seat air-conditioning device installed, but the vehicle seat air-conditioning device 10 of the present disclosure (hereinafter, simply "seat air-conditioning device 10") is a vehicle seat air-conditioning device installed in the seat cushion 122. Further, in FIG. 1, the directional market DR1 shows a left-right direction DR1 of the vehicle, i.e., is a vehicle width direction DR1. The directional market DR2 shows an up-down direction DR2 of the vehicle, i.e., is a vehicle vertical direction DR2. The directional market DR3 shows a front-rear direction of the vehicle, i.e., is a vehicle longitudinal direction DR3

The vehicle seat 12 shown in FIG. 1 includes the seat back 121 and the seat cushion 122. A passenger sitting on the vehicle seat 12, i.e., a seat occupant, leans against the seat back 121. The seat cushion 122 functions as a seat portion for the seat occupant and supports the buttocks and thigh region 14 of the seat occupant. The vehicle seat 12 is symmetrically shaped in the vehicle width direction DR1. In the present embodiment, the seat cushion 122 corresponds to a seat component member of the present disclosure.

Figure 2:
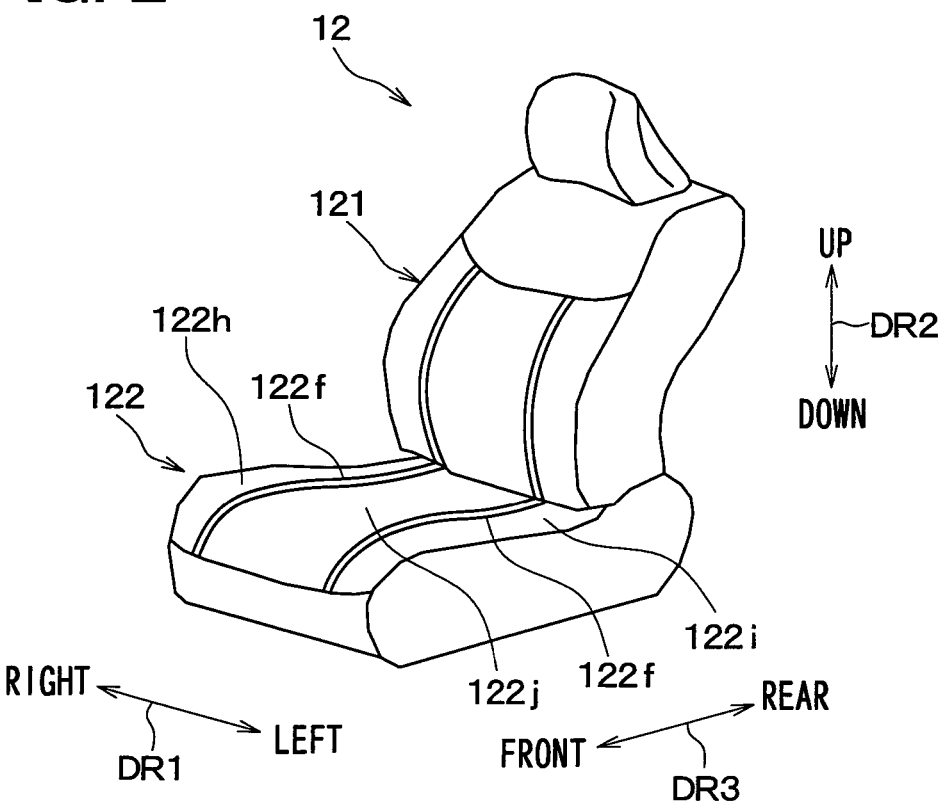
FIG. 2 is a perspective view of the vehicle seat of FIG. 1 that shows the vehicle seat in an easy to see manner.
Figure 3:
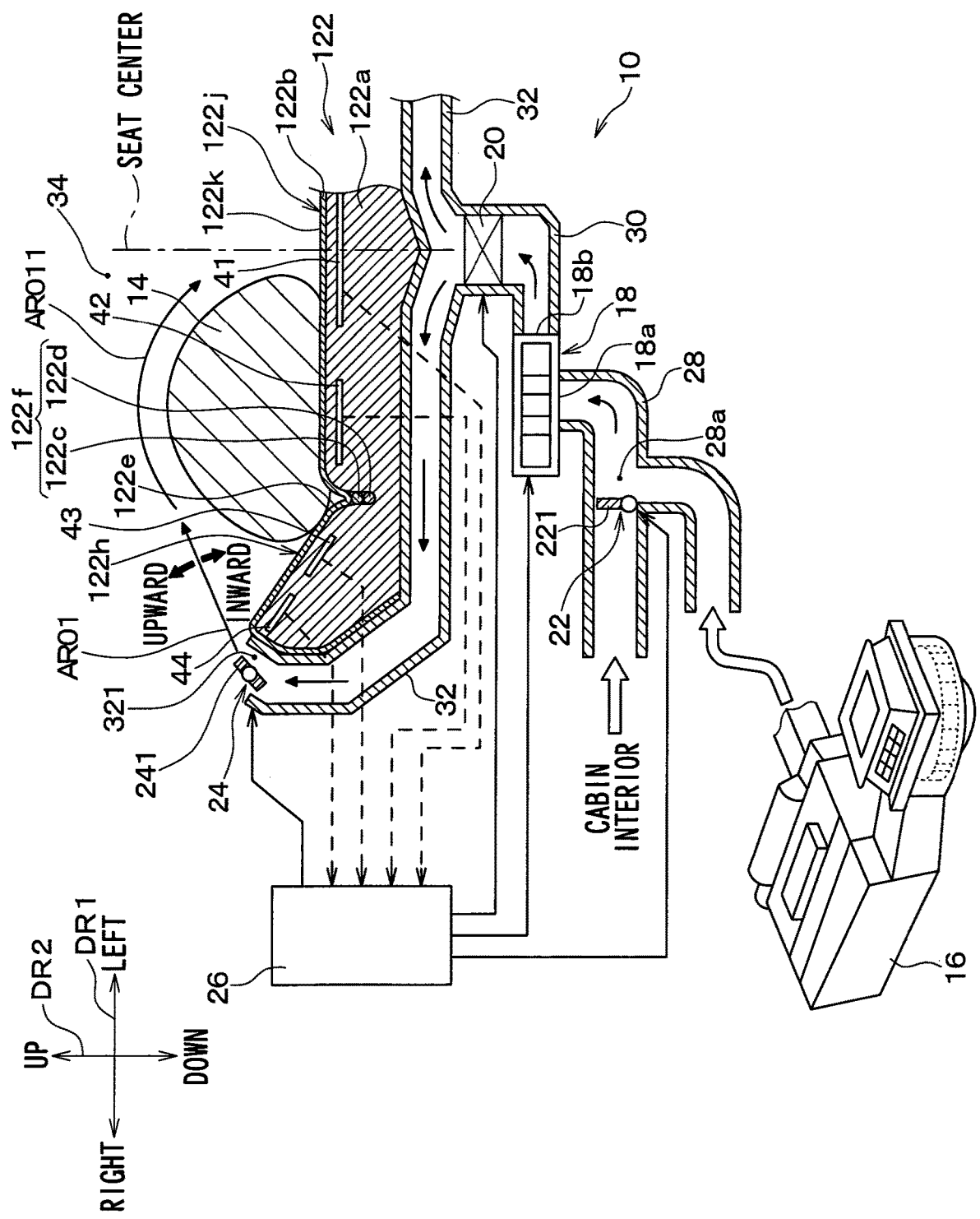
FIG. 3 is a cross sectional view along III-III of FIG. 1 in a first embodiment, and is a cross sectional view showing a seat cushion and a seat air-conditioning device.

FIG. 2 is a perspective view of the vehicle seat 12 showing the vehicle seat 12 in an easy to see manner. FIG. 3 is a cross section view along III-III of FIG. 1, and is a cross section view of the seat cushion 122 and the seat air-conditioning device 10. In FIG. 3, a cross section view of the thigh region 14 of the seated occupant on the seat cushion 122 is shown. Further, since the seat cushion 122 and the seat air-conditioning device 10 are substantially symmetrically shaped in the vehicle width direction DR1, in FIG. 3, the left half of the vehicle in the vehicle width direction DR1 is omitted from illustration. This omission in illustration also applies to FIGS. 4 and 7 described later.

As shown in FIGS. 2 and 3, the seat cushion 122 of the vehicle seat 12 includes a seat pad 122a of elastic polyurethane foam and a seat cover 122b that covers the occupant side of the seat pad 122a.

The seat cover 122b is sewed in a three-dimensional manner along the outer shape of the seat pad 122a, and follows the outer shape of the seat pad 122a with an upholstery structure. The upholstery structure suspends the seat cover 122b in an upholstery groove 122e formed on the surface of the seat pad 122a by locking an upholstery wire 122c, which is disposed on the reverse side of the seat cover 122b, with an insert wire 122d, which is buried in the seat pad 122a.

This upholstery wire 122c and the insert wire 122d form an upholstery portion 122f. As shown in FIG. 2, a pair of the upholstery portion 122f is disposed along the vehicle width direction DR1, and each is formed to extend in the vehicle longitudinal direction DR3 along the outer shape of the occupant side of the seat cushion 122. Further, as shown in FIG. 3, the upholstery portion 122f function as cover joining portions which join the seat cover 122b to the seat pad 122a.

As shown in FIG. 2, the occupant side surface of the seat cushion 122 is formed of three parts which are lined up along the vehicle width direction DR1. These three parts include a right side seat peripheral portion 122h, a left side seat peripheral portion 122i, and a center seat portion 122j interposed between the seat peripheral portions 122h, 122i. The two seat peripheral portions 122h, 122i are symmetrically shaped with the center seat portion 122j interposed therebetween. A passenger support surface 122k (refer to FIG. 3) is formed on the occupant side of the center seat portion 122j. The passenger support surface 122k supports the occupant, i.e., a passenger. In other words, the center seat portion 122j is a passenger support portion that directly contacts the passenger to support the passenger.

The right side seat peripheral portion 122h is adjacent to the center seat portion 122j through one of the pair of upholstery portions 122f in the vehicle width direction DR1. Further, the left side seat peripheral portion 122i is adjacent to the center seat portion 122j through the other one of the pair of upholstery portions 122f in the vehicle width direction DR1. In other words, the center seat portion 122j is formed in the seat cushion 122 between the pair of upholstery portions 122f, and the seat peripheral portions 122h, 122i are formed in the seat cushion 122 outside of each of the pair of upholstery portions 122f in the vehicle width direction DR1. Further, the structure of the seat back 121 is the same as the above described structure of the seat cushion 122.

As shown in FIGS. 1 and 3, the seat air-conditioning device 10 is disposed in the vehicle seat 12, and is arranged from below the seat cushion 122 to the sides. The seat air-conditioning device 10 is an air-conditioning device that intakes air from a vehicle cabin interior air-conditioner unit 16 or air inside the vehicle cabin. This air is heated, and the seat air-conditioning device 10 blows the warm air from either side of the seat cushion 122 in the vehicle width direction DR1 toward the surface of each of the left and right thigh regions 14 of the seated occupant. In other words, the seat air-conditioning device 10 is an air-conditioning device that blows warm air from around the vehicle seat 12 toward the seated occupant. Further, the vehicle cabin interior air-conditioner unit 16 is a typical air-conditioner unit disposed in an instrument panel, and includes an evaporator and a heater core. Then, by circulating a coolant which is heated or cooled by a heat exchanger disposed outside the vehicle cabin, the vehicle cabin interior air-conditioner unit 16 air-conditions the vehicle cabin.

As shown in FIG. 3, the seat air-conditioning device 10 includes a ventilator 18, a heat exchanger 20, an intake air switching device 22, a blowing direction changing device 24, ventilation pipes connecting these elements, and a control device 26. The ventilator 18 is an electric centrifugal blower that intakes air from an air inlet 18a and blows out air from an air outlet 18b. The ventilator 18 rotates and ventilates according to a control signal form the control device 26.

The air inlet 18a of the ventilator 18 is connected to one end of an intake ventilation pipe 28. The intake air switching device 22 is disposed in the other end of the intake ventilation pipe 28. The intake air switching device 22 includes a pivot door 221 and an actuator that rotates the pivot door 221 according to a control signal from the control device 26.

The intake air switching device 22 alternatively switches between a first intake state and a second intake state according to the pivot position of the pivot door 221. The other end of the intake ventilation pipe 28 is an air intake portion 28a. In the first intake state, the air intake portion 28a is set so air in the vehicle cabin may be introduced into the intake ventilation pipe 28, while air from the vehicle cabin interior air-conditioner unit 16 is blocked. In the second intake state, air is blocked from being introduced from inside the vehicle cabin, while air from the vehicle cabin interior air-conditioner unit 16 may be introduced into the intake ventilation pipe 28. In this regard, either the air in the vehicle cabin or the air from the vehicle cabin interior air-conditioner unit 16 is guided to the air inlet 18a of the ventilator 18. The air from the vehicle cabin interior air-conditioner unit 16 may be, for example, be guided from a pipe that branches from a pipe connected to a foot outlet of the vehicle cabin interior air-conditioner unit 16. This air is air-conditioned air that passed through the evaporator in the vehicle cabin interior air-conditioner unit 16. In addition, the intake air switching device 22 and the intake ventilation pipe 28 correspond to an air intake portion of the present disclosure.

The heat exchanger 20 is a heating heat exchanger that heats the air blown by the ventilator 18, and may be, for example, a PTC heater. Specifically, such a PTC heater includes an electrical resistor having a positive temperature-resistance characteristic in which an electrical resistance value increases rapidly at a predetermined temperature. A relay ventilation pipe 30 is disposed between the heat exchanger 20 and the air outlet 18b of the ventilator 18. The air intake side of the heat exchanger 20 is connected to the air outlet 18b of the ventilator 18 through the relay ventilation pipe 30.

The air outflow side of the heat exchanger 20 is connected to a blowout ventilation pipe 32. The blowout ventilation pipe 32 branches out toward either side in the vehicle width direction DR1. An end of the blowout ventilation pipe 32 opposite from the heat exchanger 20 forms an air blowout portion 321 that opens into the vehicle cabin. The air blowout portion 321 blows out air, which is blown by the ventilator 18 and guided from the heat exchanger 20. Further, the air blowout portion 321 opens so as to blow out air blown by the ventilator 18 toward the seated occupant.

Specifically, the air blowout portion 321 is disposed outward of the seat cushion 122 in the vehicle width direction DR1 so as to be adjacent to the seat cushion. Further, the air blowout portion 321 opens toward the occupant side at the edge of the center seat portion 122j. In addition, the intake ventilation pipe 28, the relay ventilation pipe 30, and the blowout ventilation pipe 32 may constitute a duct member integrally formed by resin.

As shown in FIG. 3, the blowing direction changing device 24 is disposed in the air blowout portion 321 of the blowout ventilation pipe 32, and chances the blowing direction of the air being blown out by the air blowout portion 321. The blowing direction changing device 24 includes an air guide member 241 and an actuator that rotates the air guide member 241 according to a control signal from the control device 26. The air guide member 241 is an air guiding plate that changes the blowing direction of the air being blown out by the air blowout portion 321. The blowing direction changing device 24 corresponds to a blowing direction changing portion of the present disclosure.

Figure 4:
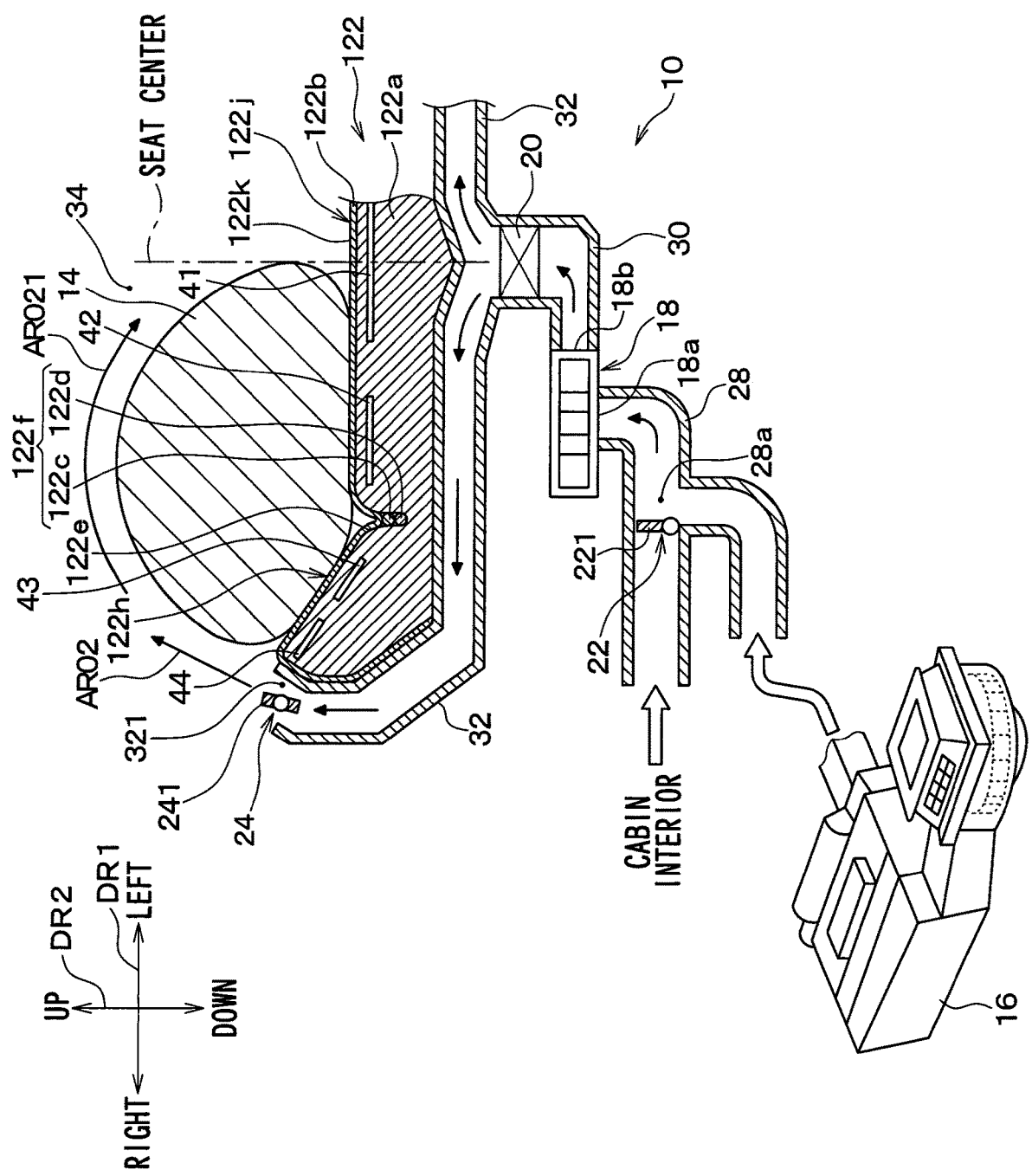
FIG. 4 is a cross sectional view along III-III of FIG. 1 in a first embodiment, and shows an air blowing direction of an air blowout portion being in a more upward state than FIG. 3.

The blowing direction changing device 24 causes air to be blown from the air blowout portion 321 toward a passenger space 34 occupying above the passenger support surface 122k of the center seat portion 122j, but continuously changes the air blowing direction of the air blowout portion 321 according to the rotation position of the air guide member 241. For example, the blowing direction changing device 24 may change the air blowing direction of the air blowout portion 321 to an inward direction of the vehicle seat 12, as shown by the arrow AR01 in FIG. 3, or to a direction upward of the arrow AR01, as shown by the arrow AR02 in FIG. 4. Further, FIG. 4 is a cross sectional view along III-III of FIG. 1 similar to FIG. 3, but shows the air blowout portion 321 blowing air in a different direction than FIG. 3. Further, the above described passenger space 34 means a three-dimensional range included above the passenger support surface 122k, and therefore does not change whether a seated occupant is or is not on the passenger support surface 122k.

The control device 26, shown in FIG. 3, is an electronic control unit comprising a well known microcomputer and surrounding circuitry. The microcomputer is formed of a CPU, ROM, RAM, and like. The control device 26 performs a variety of control processes according to computer programs pre-recorded on the ROM and the like. The control device 26 corresponds to a controller of the present disclosure.

The seat air-conditioning device 10 includes various sensors typically included in sear air-conditioning devices. In addition to those, as shown in FIG. 3, the seat air-conditioning device 10 includes a first weight sensor 41, a second weight sensor 42, a third weight sensor 43, and a fourth weight sensor 44. These weight sensors 41, 42, 43, 44 are embedded inside the seat pad 122a of the seat cushion 122, and detect a weight from the occupant side, i.e., the weight due to the seated occupant. Further, in FIG. 1, in order to show FIG. 1 in an easy to see manner, not all of the weight sensors 41, 42, 43, 44 are illustrated.

As shown in FIG. 3, the first weight sensor 41, the second weight sensor 42, the third weight sensor 43, and the fourth weight sensor 44 are arranged, in order, outward from the seat center of the vehicle seat 12 to extend along a row in the vehicle width direction DR1. In addition, these sensors are arranged in a symmetrical manner with the seat center as the reference, thus one of the first weight sensor 41 is provided, and two of each of the second to fourth weight sensors 42, 43, 44 are provided.

Specifically, in the vehicle width direction DR1, the first weight sensor 41 is disposed in the seat center, and the second weight sensors 42 are arranged in a pair at symmetrical locations with the first weight sensor 41 interposed thereinbetween. Further, the third weight sensors 43 are arranged in a pair at symmetrical locations with the first weight sensor 41 and the second weight sensors 42 interposed thereinbetween, and the fourth weight sensors 44 are arranged in a pair at symmetrical locations with the first to third weight sensors 41, 42, 43 interposed thereinbetween. Further, the first and second weight sensors 41, 42 are disposed in the center seat portion 122j of the seat cushion 122, while the third and fourth weight sensors 43, 44 are disposed in the seat peripheral portions 122h, 122i.

Detection signals from sensors including the weight sensors 41, 42, 43, 44 are successively input into the control device 26, and the control device 26 performs a variety of air-conditioning controls by causing the ventilator 18, the heat exchanger 20, the intake air switching device 22, the blowing direction changing device 24, and the like to operate. For example, the control device 26 performs the control process of FIG. 5, which is described later.

Figure 5:
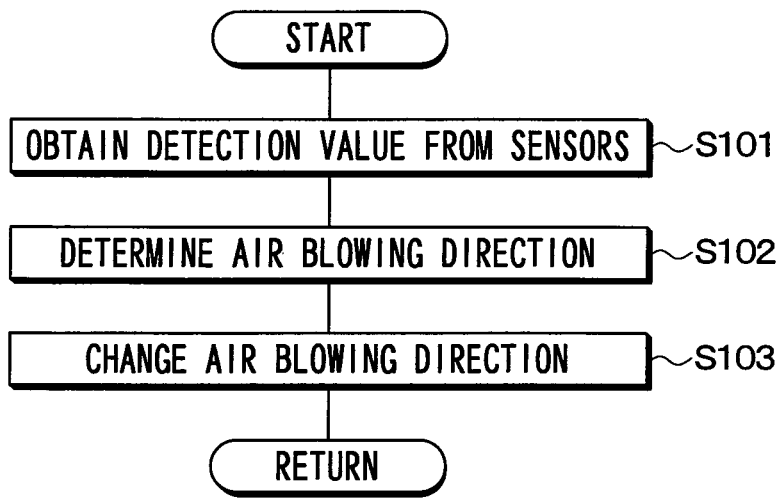
FIG. 5 is a flow chat shows control processing of a controller of FIG. 3.

FIG. 5 is a flowchart showing a control process of the control device 26. For example, when a seat air-conditioning switch, which is operated by a passenger and is not illustrated, is switched on, the seat air-conditioning device 10 becomes active. Then, the control device 26 causes the ventilator 18 to start blowing air and the heat exchanger 20 to begin heating the ventilation air. Then, the control process shown in the flow chart of FIG. 5 is repeatedly performed with a periodic manner.

First, at S101 of FIG. 5, the control device 26 obtains weights as the detection values of each of the weight sensors 41, 42, 43, 44. Then, after S101, the control process continues to S102.

Figure 6:
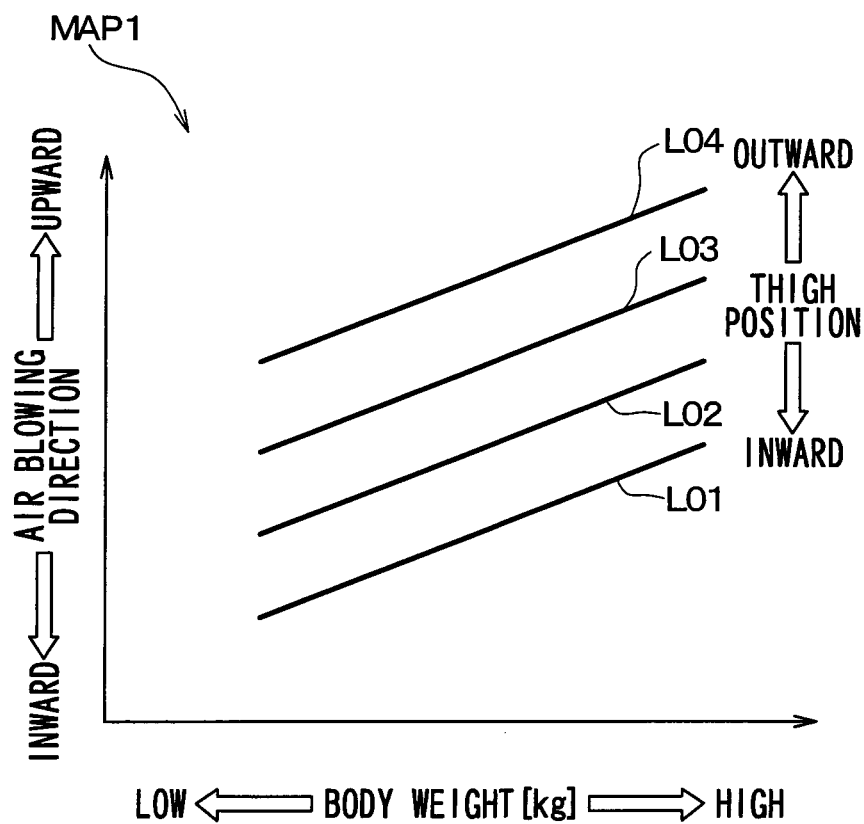
FIG. 6 is a predetermined blowing direction map for setting an air blowing direction of an air blowout portion in a first embodiment.

At S102, the air blowing direction of the air blowout portion 321, i.e., the orientation of the air guide member 241 of the blowing direction changing device 24, is determined based on the detection values of each weight sensor 41, 42, 43, 44 according to a blowing direction map MAP1 of FIG. 6, which is a predetermined relationship.

The blowing direction map MAP1 of FIG. 6 is experimentally determined in advance such that the air blown out from the air blowout portion 321 is directed toward a particular region of the seated occupant or toward a particular region around the seated occupant. When viewing the thigh region 14 of the seated occupant from the air blowout portion 321 in FIG. 3, this particular region is a space at or around the top of that thigh region 14. By setting the blowing direction map MAP1 in this way, as shown by the arrow AR01 in FIG. 3 or the arrow AR02 in FIG. 4, the air-conditioned air is blown from the air blowout portion 321 so as to flow along the surface of the thigh region 14, which is a body surface of the seated occupant. Due to this, the flow of the air-conditioned air becomes a Coanda flow that follows the surface of the thigh region due to the Coanda effect, as shown by the arrow AR011 in FIG. 3 or the arrow AR021 in FIG. 4, and more easily reaches the center of the vehicle seat 12.

Specifically, the blowing direction map MAP1 of FIG. 6 is set such that as the body weight of the seated occupant increases or as the position of the thigh region 14 of the seated occupant on the seat cushion 122 is further outward in the vehicle width direction DR1, the air blowing direction of the air blowout portion 321 is changed from pointing inward in the vehicle seat 12 to pointing upward.

In order for the control device 26 to recognize the position of the thigh region 14, weight thresholds are experimentally determined in advance for determining whether the thigh region 14 is sitting above each weight sensor 41, 42, 43, 44 with respect to the weights detected by each of these sensors. Then, regarding each of the weight sensors 41, 42, 43, 44, if the weight detected by the weight sensor is at or above the above described weight threshold, the control device 26 determines that weight sensor to be in an on state, and if the detected weight is less than the weight threshold, then the control device 26 determines that weight sensor to be in an off state.

As a result of these determinations, the control device 26 recognizes that as weight sensors in the on state exist further outward in the vehicle width direction DR1, the thigh region 14 of the seated occupation is positioned further outward in the vehicle width direction DR1. Then, based on this recognition, the control device 26 selects one of the relationships L01 to L04 in FIG. 6 for determining the air blowing direction based on the weight of the seated occupant.

To be specific, for example if the second to fourth weight sensors 42, 43, 44 are in the off state, then the relationship of L01 is selected as the relationship for determined the above described air blowing direction.

Further, if the third and fourth weight sensors 43, 44 are in the off state and the second weight sensors 42 are in the on state, then it is recognized that the thigh region 14 is positioned more outward on the seat cushion 122 in the vehicle width direction DR1 as compared to the case of when the second to fourth weight sensors 42, 43, 44 are in the off state. Then, the relationship of L02 is selected as the relationship for determined the above described air blowing direction.

Further, if the fourth weight sensors 44 are in the off state and the third weight sensors 43 are in the on state, then it is recognized that the thigh region 14 is positioned more outward on the seat cushion 122 in the vehicle width direction DR1 as compared to the case when the third and fourth weight sensors 43, 44 are in the off state and the second weight sensors 42 are in the on state. As a result, the relationship of L03 is selected as the relationship for determined the above described air blowing direction.

Further, if the fourth weight sensors 44 are in the on state, then it is recognized that the thigh region 14 is positioned more outward on the seat cushion 122 in the vehicle width direction DR1 as compared to the case when the fourth weight sensors 44 are in the off state and the third weight sensors 43 are in the on state. As a result, the relationship of L04 is selected as the relationship for determined the above described air blowing direction.

In addition, if the relationships L01 to L04 are compared to each other assuming a same body weight, as understood from FIG. 6, an air blowing direction determined from the relationship of L01 is more inward than when determined from the relationship of L02. Further, an air blowing direction determined from the relationship of L02 is more inward than when determined from the relationship of L03. Further, an air blowing direction determined from the relationship of L03 is more inward than when determined from the relationship of L04.

For example, the thigh region 14 shown in FIG. 4 is positioned more outward on the seat cushion 122 in the vehicle width direction DR1 as compared to the thigh region 14 shown in FIG. 3. Then, according to FIG. 4, the thigh region 14 is on top of the fourth weight sensor 44 so the fourth weight sensor 44 is in the on state, thus in this case the relationship of L04 is selected. Conversely, the thigh region 14 of FIG. 3 is not positioned on top of the third and fourth weight sensors 43, 44 and the third and fourth weight sensors 43, 44 are in the off state, while the thigh region 14 is positioned on top of the second weight sensor 42 so the second weight sensor 42 is in the on state. In this case, the relationship of L02, which determines a more inward air blowing direction of the air blowout portion 321 than the relationship of L04, is selected.

The control device 26 recognizes the position of the thigh region 14 selects one of the relationships of L01 to L04 in this manner, and in addition, calculates the body weight of the seated occupant from the detection values of the weight sensors 41, 42, 43, 44. For example, the body weight of the seated occupant may be calculated by summing the weights detected by each of the weight sensors 41, 42, 43, 44. This is because it may be estimated that as the body weight of the seated occupant increases, the build of the seated occupant also increases and so the thigh region 14 becomes thicker. Then, as the thigh region 14 becomes thicker, it is necessary for the air blowing direction of the air blowout portion 321 to point upward so as to be higher than the height of the thigh region 14.

The control device 26 selections one of the relationships L01 to L04 and calculates the body weight of the seated occupant, then determines the air blowing direction of the air blowout portion 321 based on the body weight of the seated occupant according to the selected one of the relationships L01 to L04. After determined the air blowing direction of the air blowout portion 321 at S102, the control process continues to S103.

At S103, the air blowing direction of the air blowout portion 321 is changed by the blowing direction changing device 24 such that the air-conditioned air is blown out from the air blowout portion 321 in the air blowing direction of the air blowout portion 321 determined at S102. Specifically, a control signal is output to the actuator of the blowing direction changing device 24 and, accordingly, the air guide member 241 of the blowing direction changing device 24 is rotated such that the air-conditioned air is blown out from the air blowout portion 321 in the air blowing direction determined at S102.

As described above, the control device 26 obtains a sitting position, i.e., the position of the thigh region 14, and a body weight that can estimate the build of the seated occupant, from weights which are the detection values of the weight sensors 41, 42, 43, 44. Then, the control device 26 causes the air guide member 241 of the blowing direction changing device 24 to rotate based on the obtained body weight and sitting position. Accordingly, the control device 26 functions as a controller that causes the blowing direction changing device 24 to change the air blowing direction of the air blowout portion 321 based on passenger information including the build and the sitting position of a passenger, i.e., the seated occupant.

In addition, the processing of each step of FIG. 5 described above constitutes a means for implementing its respective function.

As described above, according to the present embodiment, the control device 26 causes the blowing direction changing device 24 to change the air blowing direction of the air blowout portion 321 of the blowout ventilation pipe 32 based on passenger information including the build and the sitting position of a passenger, i.e., the seated occupant. Accordingly, air may be blown in a direction according to the build and sitting position of the passenger.

Further, according to the present embodiment, the blowing direction map MAP1 of FIG. 6 is set in advance such that the air-conditioned air blown from the air blowout portion 321 is directed toward a space at or around the top of the thigh region 14 of the seated occupant, when viewing the thigh region 14 from the air blowout portion 321 in FIG. 3. Accordingly, the air-conditioned air flows as shown by the arrow AR011 in FIG. 3 or the arrow AR021 in FIG. 4 due to the Coanda effect, and more easily reaches the center of the vehicle seat 12. For this reason, it is possible to provide a sensation where the seated occupant is sufficiently warmed.

Further, according to the present embodiment, the blowing direction map MAP1 of FIG. 6 is, specifically, set such that as the body weight of the seated occupant increases or as the position of the thigh region 14 of the seated occupant on the seat cushion 122 is further outward in the vehicle width direction DR1, the air blowing direction of the air blowout portion 321 is changed from pointing inward in the vehicle seat 12 to pointing upward. For this reason, by conforming to the build and sitting position of the seated occupant, the air blowing direction of the air blowout portion 321 may be st such that the Coanda effect occurs more easily. For that reason, even if the build or the sitting position of the seated occupant changes, the comfort of the seated occupant may be maintained.

Further according to the present embodiment, the air blowout portion 321 is disposed so as to be adjacent to the seat cushion 122 in the vehicle width direction DR1. For this reason, the air blowout portion 321 is close to the thigh region 14 of the seated occupant, and it is possible to suppress thermal diffusion which occurs when the air-conditioned air travels from the air blowout portion 321 to the thigh region 14 of the seated occupant. Accordingly, it is possible to efficiently provide a comfortable sensation to the seated occupant.

Further according to the present embodiment, the ventilator 18 is able to suck in, through the intake ventilation pipe 28, air which has been temperature controlled by the vehicle cabin interior air-conditioner unit 16. Accordingly, seat air-conditioning may be performed by using the air-conditioning ability of the vehicle cabin interior air-conditioner unit 16.

Second Embodiment

Next, a second embodiment of the present disclosure will be explained. In the present embodiment, an explanation will be focused on points which differ from the previously discussed first embodiment, and portions which are the same as, or equivalent to, those of the first embodiment will be omitted or simplified. The same applies to the third embodiment discussed later.

Figure 7:
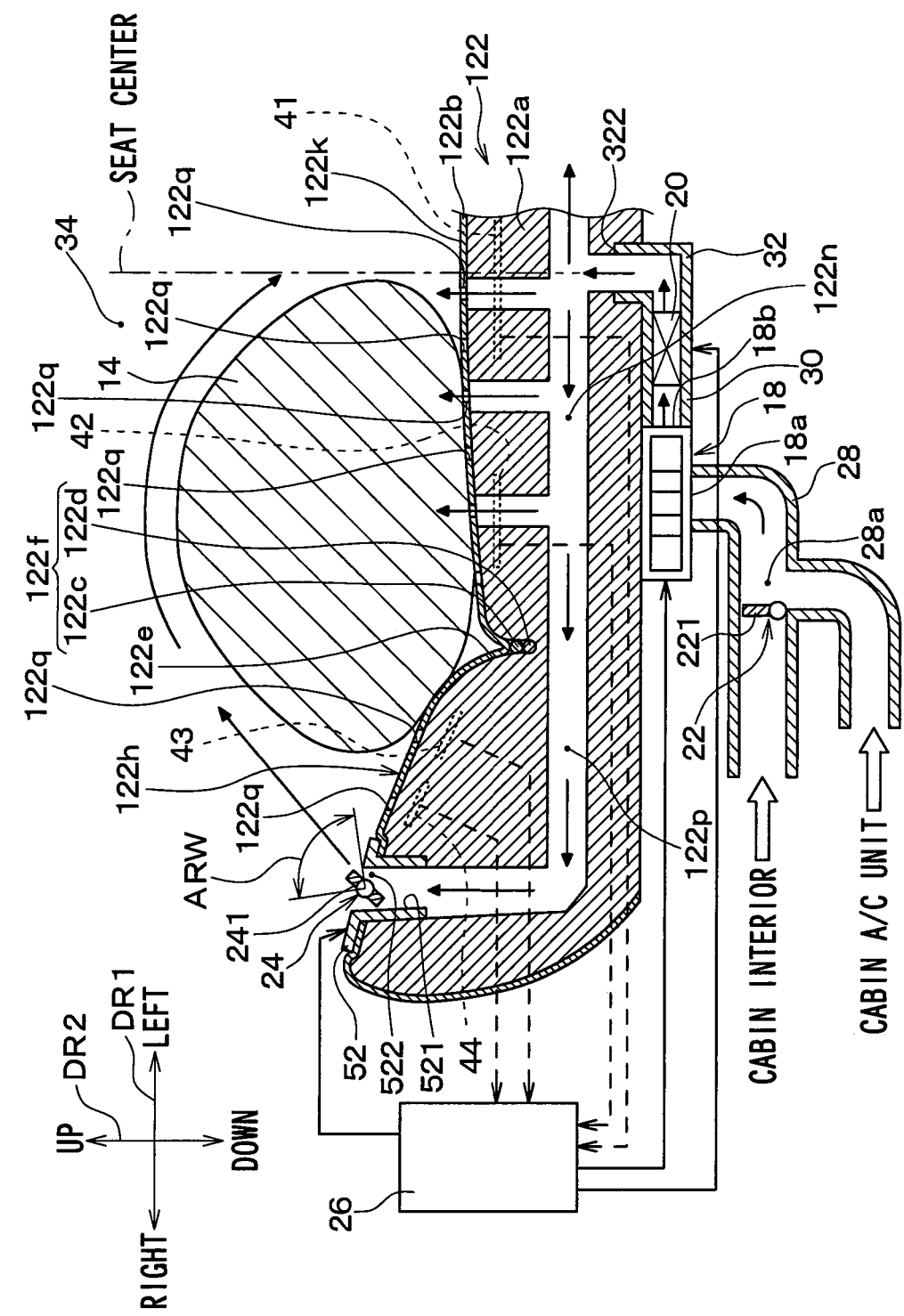
FIG. 7 is a cross sectional view of a seat cushion and a seat air-conditioning device of a second embodiment, and corresponds to FIG. 3 of the first embodiment.

FIG. 7 is a cross sectional view of a seat cushion 122 and a seat air-conditioning device 10 according to the present embodiment, and corresponds to FIG. 3 of the first embodiment. As shown in FIG. 7, the blowout ventilation pipe 32 of the present embodiment does not wrap around the sides of the seat cushion 122, and the blowout ventilation pipe 32 does not have the air blowout portion 321 (refer to FIG. 3). An end portion 322 of the blowout ventilation pipe 32, which is at an opposite end from the heat exchanger 20 side, is connected from the bottom of the seat cushion 122 to a first ventilation passage 122n formed in the seat pad 122a.

The first ventilation passage 122n of the seat pad 122a branches within the seat pad 122a so as to deliver air from the heat exchanger 20 to the entire seat surface, and opens toward the seat cover 122b. Formed in this way, the first ventilation passage 122n delivers air blown form the ventilator 18 toward a plurality of micro holes 122q of the seat cover 122b.

The seat cover 122b of the seat cushion 122, which includes the passenger support surface 122k, is a perforated cover that forms the plurality of micro holes 122q. The seat cover 122b may be formed by, for example, natural leather or artificial leather. Each of the micro holes 122q of the seat cover 122b is a ventilation hole with a diameter of about 1 mm, and blows out air, which is blown by the ventilator 18 and guided from the heat exchanger 20 through the first ventilation passage 122n, toward the seated occupant.

Further, a second ventilation passage 122p is formed in the seat pad 122a and sends air blown by the ventilator 18 toward an air blowout portion 522 of a bezel 52. Specifically, one end of the second ventilation passage 122p is connected to the first ventilation passage 122n, and the other end of the second ventilation passage 122p is connected to a bezel ventilation passage 521 of the bezel 52. For this reason, the air blown by the ventilator 18 flows through the first ventilation passage 122n and into the second ventilation passage 122p.

The seat air-conditioning device 10 of the present embodiment includes the bezel 52. This bezel 52 is formed by an elastic member, such as rubber, which is elastic and which is harder than the seat cushion 122. The bezel ventilation passage 521 is formed in the bezel 52 as a throughhole, and the bezel 52 is inserted into the top surface of the right side seat peripheral portion 122h of the seat cushion 122, i.e., the seated occupant side, such that the bezel ventilation passage 521 is connected to the second ventilation passage 122p. The same applies to the left side seat peripheral portion 122i as well (refer to FIG. 2).

An end portion of the bezel that opens above the seat cushion 122 forms the air blowout portion 522 which opens into the vehicle cabin interior and blows out air guided from the heat exchanger 20. In other words, the air blowout portion 522 in the present embodiment is disposed in each of the right side seat peripheral portion 122h and the left side seat peripheral portion 122i.

The blowing direction changing device 24 of the present embodiment is disposed in the air blowout portion 522 of the bezel 52, and aside from this point is the same as that of the first embodiment. For example, the blowing direction changing device 24 is able to change the air blowing direction of the air blowout portion 522 of the bezel 52 within the range of the arrow ARw of FIG. 7.

As described above, according to the present embodiment, the air blowing direction of the air blowout portion 522 may be changed based on the build and the sitting position of the seated occupant in the same manner as the first embodiment, thus the same effects as the first embodiment may be obtained.

Further according to the present embodiment, the warm air that passed through the heat exchanger 20 is blown out from the plurality of micro holes 122q and at the same time is blown out from the air blowout portion 522. Accordingly, a high degree of comfort may be provided to the seated occupant.

Further according to the present embodiment, the second ventilation passage 122p is connected to the first ventilation passage 122n, and the air blown by the ventilator 18 flows through the first ventilation passage 122n and into the second ventilation passage 122p. Accordingly, it is not necessary to connect the blowout ventilation pipe 32 to the second ventilation passage 122p in addition to the first ventilation passage 122n, and the piping may be simplified.

Third Embodiment

Next, a third embodiment of the present disclosure will be explained. In the present embodiment, an explanation will be focused on points which differ from the previously discussed first embodiment.

Figure 8:
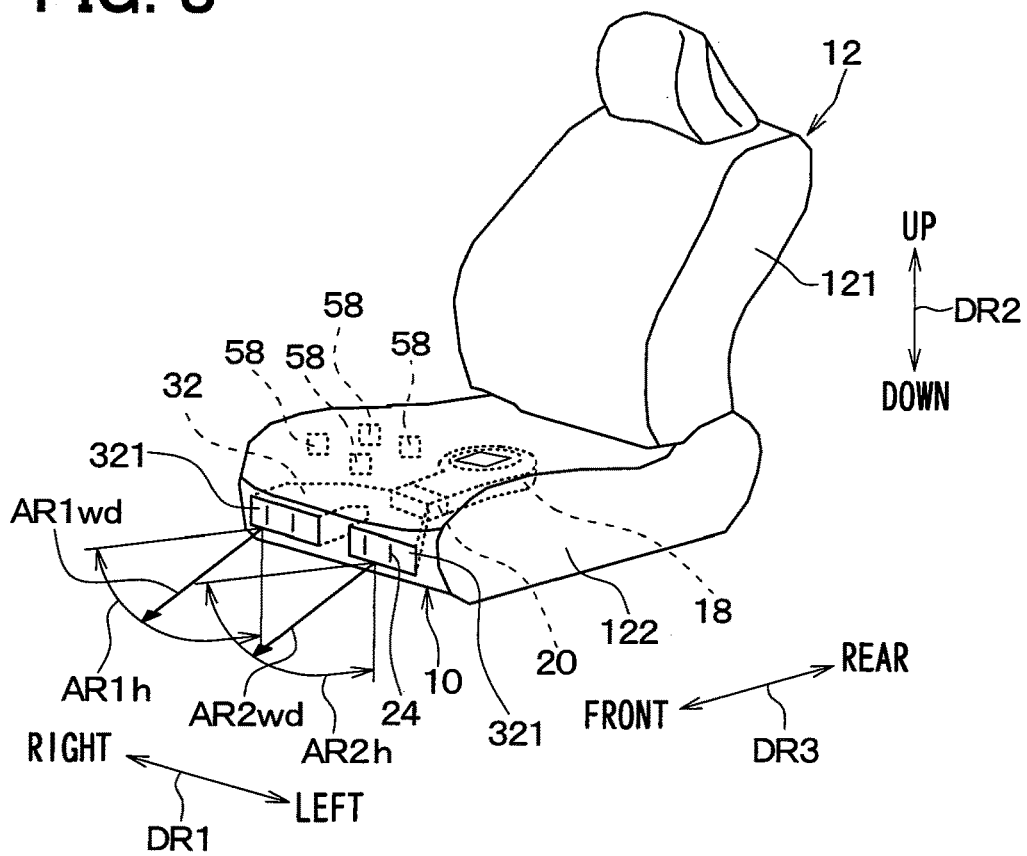
FIG. 8 is an outline perspective view showing a vehicle seat air-conditioning device and a vehicle seat having the vehicle seat air-conditioning device installed in a third present embodiment.

FIG. 8 is an outline perspective view of a vehicle seat air-conditioning device 10 and a vehicle seat 12 that has the vehicle seat air-conditioning device 10 installed, according to the present embodiment. As shown in FIG. 8, when compared with the first embodiment, the arrangement position of the air blowout portion 321 in the present embodiment is different. Specifically, the air blowout portion 321 is positioned such that the air-conditioned air from the air blowout portion 321 is blown toward the lower legs of the seated occupant. The blowing direction changing device 24 disposed in the air blowout portion 321 is able to change the air blowing direction of the air blowout portion 321, shown as the arrows AR1wd, AR2wd, in the vehicle width direction DR1 as shown by the arrows AR1h, AR2h.

When blowing air-conditioned air against the lower leg back of the seated occupant, the positions of the lower legs in the vehicle width direction DR1 greatly differs due to how much the left and right legs of the seated occupant are spread out. For this reason, if the air blowing direction of the air blowout portion 321 is not appropriate, the air-conditioned air from the air blowout portion 321 may escape past the lower legs, and in this case it may be difficult to provide a high degree of comfort.

In this regard, the seat air-conditioning device 10 of the present embodiment includes a plurality of weight sensors 58 in the seat cushion 122, and the control device 26 (refer to FIG. 3) estimates the sitting position of the seated occupant, specifically the positions of the lower legs, based on the detection signal from each of the plurality of weight sensors 58. Then, the control device 26 causes the blowing direction changing device 24 to change the air blowing direction of the air blowout portion 321 based on the passenger information including the sitting position of the seated occupant.

In particular, the plurality of weight sensors 58 of the present embodiment are the same as the weight sensors 41 to 44 of the first embodiment, and similar to the first embodiment, are arranged in a symmetrical manner along the vehicle width direction DR1 with the seat center as the reference. In FIG. 8, the weight sensors 58 are arranged in two rows in the vehicle width direction DR1.

Then, the control device 26 performs the control process according to the flowchart of FIG. 5. In other words, at S101 of FIG. 5, the control device 26 obtains each detection value from each of the plurality of weight sensors 58.

Next, at S102, the control device 26 determines the on state and off state of the weight sensors 58 in the same manner as the first embodiment, and recognizes that as weight sensors 58 in the on state exist more outward in the vehicle width direction DR1, the low legs of the seated occupant are positioned more outward in the vehicle width direction DR1. Then, the control device 26 determines the air blowing direction of the air blowout portion 321 based on the recognized lower leg positions. For example, as these recognized lower leg positions are more outward in the vehicle width direction DR1, the air blowing direction of the air blowout portion 321 will also be pointed more outward.

Next, at S103, in the same manner as the first embodiment, the blowing direction changing device 24 is caused to change the air blowing direction of the air blowout portion 312 such that the air blowout portion 321 blows the air-conditioned air in the air blowing direction of the air blowout portion 321 determined at S102. Further, in FIG. 8, the weight sensors 58 on the left side in the vehicle width direction DR1 are omitted from illustration in order to show FIG. 8 in a more easy to see manner.

According to the present embodiment, the control device 26 recognizes the lower leg positions of the seated occupant based on detection signals from the weight sensors 58, and sets the air blowing direction of the air blowout portion 321 toward the recognized lower leg positions. Accordingly, the comfort level around the lower legs of the seated occupant may be improved without needing complicated operations.

Fourth Embodiment

Next, a fourth embodiment of the present disclosure will be explained. In the present embodiment, an explanation will be focused on points which differ from the previously discussed first embodiment.

Figure 9:
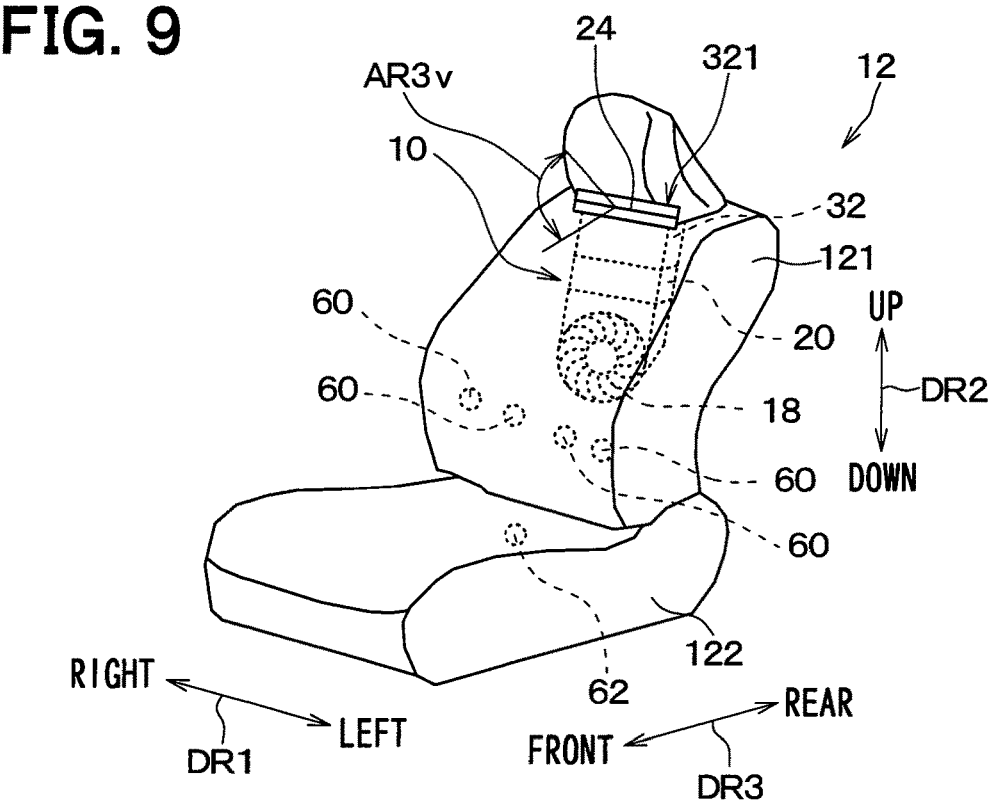
FIG. 9 is an outline perspective view showing a vehicle seat air-conditioning device and a vehicle seat having the vehicle seat air-conditioning device installed in a fourth present embodiment.

FIG. 9 is an outline perspective view of a vehicle seat air-conditioning device 10 and a vehicle seat 12 that has the vehicle seat air-conditioning device 10 installed, according to the present embodiment. As shown in FIG. 9, the seat air-conditioning device 10 of the present embodiment is disposed in the seat back 121, different form the first embodiment. Further, the arranged position of the air blowout portion 321 of the present embodiment is different when compared with the first embodiment. Specifically, the air blowout portion 321 is disposed at the upper edge of the seat back 121 such that air-conditioned air is blown from the air blowout portion 321 toward the neck or shoulders of the seated occupant. The blowing direction changing device 24 disposed in the air blowout portion 321 is able to change the air blowing direction of the air blowout portion 321 in the vehicle vertical direction DR2 as shown by the arrow AR3v.

When blowing air-conditioned air against the neck or shoulders of the seated occupant, the position of the neck and shoulders in the height direction is different for each individual occupant. In other words, the sitting height differs for each individual occupant. Further, if air-conditioned air directly contacts the head or face of a seated occupant, discomfort may be caused.

In this regard, the seat air-conditioning device 10 of the present embodiment includes a plurality of weight sensors 60 in the seat back 121, and includes a body weight sensor 62 in the seat cushion 122 for detecting the body weight of the seated occupant. Further, the control device 26 (refer to FIG. 3) obtains the body weight of the seated occupant from the detection signal of the body weight sensor 62, and also estimates the upper body width of the seated passenger based on each detection signal from the plurality of weight sensors 60. Then, the control device 26 causes the blowing direction changing device 24 to change the air blowing direction of the air blowout portion 321 based on the passenger information including the sitting height of the seated occupant, i.e., the build of the seated occupant, which is obtained from this body weight and upper body width.

Specifically, the plurality of weight sensors 60 of the present embodiment are the same as the weight sensors 41 to 44 of the first embodiment, and are arranged in a row and in a symmetrical manner along the vehicle width direction DR1 with the seat center as the reference.

Then, the control device 26 performs the control process according to the flowchart of FIG. 5. In other words, at S101 of FIG. 5, the control device 26 obtains each detection value from each of the plurality of weight sensors 60 and the body weight sensor 62.

Next, at S102, the control device 26 determines the on state and off state of the weight sensors 60 in the same manner as the first embodiment, and recognizes that as weight sensors 60 in the on state exist more outward in the vehicle width direction DR1, the upper body width of the seated occupant is wider in the vehicle width direction DR1.

Figure 10:
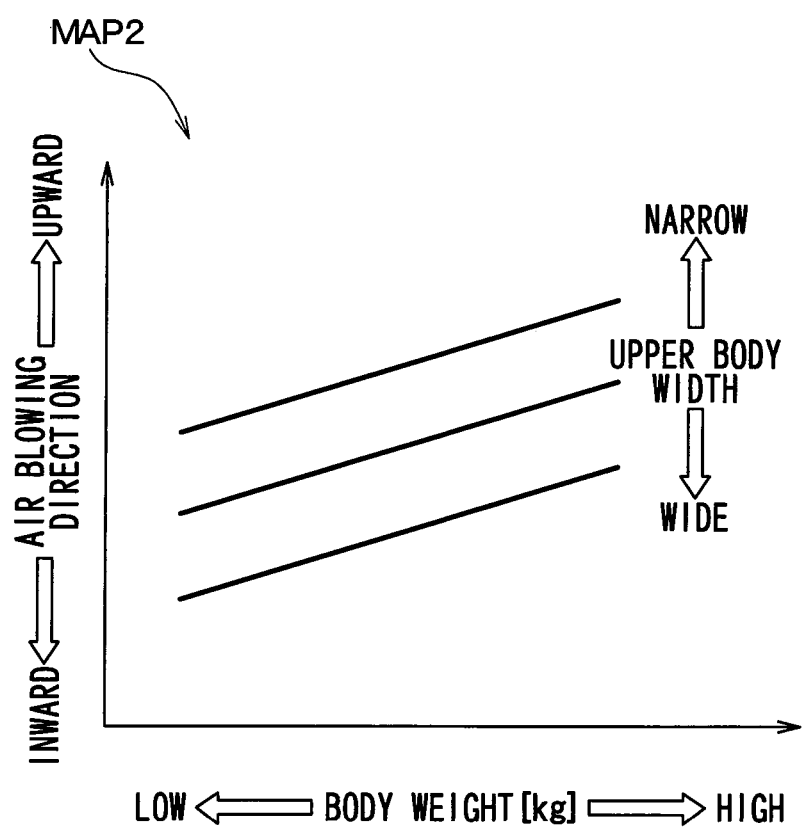
FIG. 10 is a predetermined blowing direction map for setting an air blowing direction of an air blowout portion in a fourth embodiment.

Then, the control device 26 determines the air blowing direction of the air blowout portion 321 based on the above recognized upper body width and the body weight detected by the body weight sensor 62, in accordance with a predetermined blowing direction map MAP2 shown in FIG. 10, which corresponds to the blowing direction map MAP1 (refer to FIG. 6) of the first embodiment.

Here, when comparing the same body weights, it can be considered that as the upper body width of the seated occupant is narrower the sitting height of the seated occupant is higher, whereas when comparing the same upper body widths, as the body weight is greater the sitting height is higher. Accordingly, the blowing direction map MAP2 of FIG. 10 is set such that as the upper body width is narrower or as the body width is greater, the air blowing direction of the air blowout portion 321 points more upward in the vehicle vertical direction DR2.

Next, at S103, in the same manner as the first embodiment, the blowing direction changing device 24 is caused to change the air blowing direction of the air blowout portion 312 such that the air blowout portion 321 blows the air-conditioned air in the air blowing direction of the air blowout portion 321 determined at S102.

According to the present embodiment, the control device 26 estimates the position of the neck and shoulders of the seated occupant, i.e., the sitting height of the seated occupant, based on detection signals from the weight sensors 60 and the body weight sensor 62. Then, the air blowing direction of the air blowout portion 321 is set to point toward the estimated location of the neck or shoulders. Accordingly, the comfort level around the neck or shoulders of the seated occupant may be improved without needing complicated operations.

Other Embodiments (1) In the above described first and second embodiments, at S102 of FIG. 5, the air blowing direction of the air blowout portion 321 is determined based on the passenger information including the build and the sitting position of the seated occupant. Alternatively, this passenger information may include only one of the build and the sitting position of the seated occupant. In other words, the passenger information may represent aspects of the seated occupant including the build or the sitting position of the seated occupant, and at S102, the air blowing direction of the air blowout portion 321 may be determined based on one of the build and sitting position of the seated occupant.

(2) In the above described first to third embodiments, a total of two of the air blowout portions 321, 522 are disposed to form a left and right pair in the vehicle width direction DR1, but alternatively only one of the two may be provided, with the other being not provided.

(3) In each of the above described embodiments, the weight sensors 41, 42, 43, 44 and the like are used to recognize the build and sitting position of the seated occupant. However, for example, an optical sensor, an ultrasonic sensor, an infrared sensor, or the like disposed separately from the vehicle seat inside the vehicle cabin may be used as well.

(4) In each of the above described embodiments, the ventilator 18 is a centrifugal type blower, but is not limited to this type, and may be, for example, an axial flow type blower as well.

(5) In each of the above described embodiments, the heat exchanger 20 is, as an example, a PTC heater, but is not limited to electric heaters such as PTC heaters, and may be other types of heaters as well.

(6) In each of the above described embodiments, the seat air-conditioning device 10 is an air-conditioning device that blows out warm air, but may be an air-conditioning device that blows out cool air as well. In this case, the heat exchanger 20 is not a heating heat exchanger, but is a cooling heat exchanger that cools air blown from the ventilator 18. The cooling heat exchanger may be, for example, formed of a Peltier element or the like.

(7) In each of the above described embodiments, air from inside the vehicle cabin or air from the vehicle cabin interior air-conditioner unit 16 is guided into the air inlet 18a of the ventilator 18, but only one of these may be guided into the air inlet 18a instead. In this case, the intake air switching device 22 is not needed.

(8) In the above described second embodiment, the seat cover 122b is, for example, made from natural leather or artificial leather, but may be a woven fabric such as moquette as well. In this case, the space between threads in the woven fabric function as the micro holes 122q.

(9) In the above described second embodiment, the blowout ventilation pipe 32 is connected to the first ventilation passage 122n, and the air blown by the ventilator 18 flows through the first ventilation passage 122n into the second ventilation passage 122p. However, conversely, the blowout ventilation pipe 32 may be connected to the second ventilation passage 122p, and the air blown by the ventilator 18 may flow through the second ventilation passage 122p and into the first ventilation passage 122n.

(10) In the above described first and second embodiments, the seat air-conditioning device 10 is disposed in the seat cushion 122, but may be disposed in the seat back 121 as well. In this case, the seat back 121 corresponds to the seat component member of the present disclosure.

(11) In the above described first and second embodiments, the body weight of the seated occupant is, for example, calculated by summing the weights detected by each of the weight sensors 41, 42, 43, 44. However, instead of simply summing, the body weight may be obtained as a value of multiplying the summed total value by a coefficient, or the body weight may be obtained as a value of adding a constant value to the total value.

(12) In each of the above described embodiments, the processing of each step shown in FIG. 5 is performed by a computer program, but these may constitute hard logic as well.

Further, the present disclosure is not limited to the above described embodiments, and may be appropriately changed within the scope described in the scope of the claims. In addition, each of the above described embodiments is related and may be combined as appropriate, except for combinations which are obviously improper. For example, the third embodiment may be combined with the first embodiment or the second embodiment, and the fourth embodiment may be combined with the first embodiment or the second embodiment. In addition, the first embodiment may be combined with the second embodiment such that air-conditioned air is blown out from the plurality of micro holes 122q formed in the seat cushion 122, and at the same time air-conditioned air is blown out from the air blowout portion 321 adjacent at the outer side of the seat cushion 122.

Further, needless to say, in each of the above described embodiments, the elements constituting each embodiment are not necessarily essential, except for elements which are specifically shows as being essential or are clearly essential on a fundamental level. Further, in each of the above described embodiments, in case a numerical value is described for a counting number, a value, an amount, a range or the like for a component element of an embodiment, these specific values are not limiting, except in the case in which a specific number liming is clearly described as being essential or is clearly essential on a fundamental level. Further, in each of the above described embodiments, if the material properties, shapes, positional relationships or the like of component elements of an embodiment are described, these material properties, shapes, positional relationships or the like are not limiting, except in the case in which a specific material property, shape, positional relationship or the like is clearly described as being essential or is clearly essential on a fundamental level.

What is claimed is:

1. A vehicle seat air-conditioning device, comprising:
    a ventilator that blows air;
    an air blowout portion that is open so as to blow out the air blown by the ventilator toward a passenger sitting in a vehicle seat;
    a blowing direction changing portion disposed in the air blowout portion, the blowing direction changing portion changing a blowing direction of the air blown out from the air blowout portion; and
    a controller that causes the blowing direction changing portion to change the blowing direction based on passenger information, the passenger information representing a body weight of the passenger, wherein
    the vehicle seat includes a seat cushion, the seat cushion including a passenger support portion that supports the passenger,
    the air blowout portion opens around the passenger support portion of the seat cushion at a passenger side thereof, and
    the controller is programmed to:
        acquire the passenger information to detect the body weight of the passenger; and
        control the blowing direction changing portion such that as the body weight of the passenger increases, the blowing direction changing portion changes the blowing direction from pointing inward to pointing upward at the vehicle seat.

2. The vehicle seat air-conditioning device of claim 1, wherein
    the vehicle seat includes a seat component member corresponding to one of a seat back and the seat cushion, and
    the air blowout portion is disposed so as to be adjacent to the seat component member in the vehicle width direction.

3. The vehicle seat air-conditioning device of claim 1, wherein
    the vehicle seat includes a seat component member corresponding to one of a seat back and the seat cushion, and
    the seat component member includes a seat pad having elasticity, a seat cover that covers a surface of the passenger side of the seat pad, and cover joining portions formed as a pair lined up in the vehicle width direction, the cover joining portions joining the seat cover to the seat pad, and
    the air blowout portion is disposed in seat peripheral portions, the seat peripheral portions being formed in the seat component member outward of each of the pair of cover joining portions in the vehicle width direction.

4. The vehicle seat air-conditioning device of claim 3, wherein
    a plurality of micro holes are formed in the seat cover, the plurality of micro holes blowing out the air blown by the ventilator, and
    the seat pad has formed therein a first ventilation passage that sends the air blown by the ventilator to the micro holes, and a second ventilation passage that sends the air blown by the ventilator to the air blowout portion.

5. The vehicle seat air-conditioning device of claim 4, wherein
    the second ventilation passage is connected to the first ventilation passage, and
    the first ventilation passage and the second ventilation passage are formed such that the air blown by the ventilator flows through one of the first ventilation passage and the second ventilation passage and into the other of the first ventilation passage and the second ventilation passage.

6. The vehicle seat air-conditioning device of claim 1, further comprising:
    a heat exchanger disposed at an airflow upstream side of the air blowout portion, the heat exchanger heating or cooling the air blown out by the air blowout portion.

7. The vehicle seat air-conditioning device of claim 1, further comprising:
    an air intake portion that guides air, which is guided from a vehicle cabin interior air-conditioner unit disposed separately from the vehicle seat, toward an air intake side of the ventilator.

8. The vehicle seat air-conditioning device of claim 1, further comprising:
a memory storing a blowing direction map representing a predetermined relationship between the blowing direction and the body weight of the passenger, wherein
the controller reads the blowing direction map so as to control the blowing direction changing portion.

9. A vehicle seat air-conditioning device, comprising:
a ventilator that blows air;
an air blowout portion that is open so as to blow out the air blown by the ventilator toward a passenger sitting in a vehicle seat;
a blowing direction changing portion disposed in the air blowout portion, the blowing direction changing portion changing a blowing direction of the air blown out from the air blowout portion; and
a controller that causes the blowing direction changing portion to change the blowing direction based on passenger information, the passenger information representing a position of a thigh region of the passenger with respect to the vehicle seat, wherein
the vehicle seat includes a seat cushion, the seat cushion including a passenger support portion that supports the passenger,
the air blowout portion opens around the passenger support portion of the seat cushion at a passenger side thereof, and
the controller is programmed to:
acquire the passenger information to detect a position of the thigh region of the passenger on the seat cushion; and
control the blowing direction changing portion such that as the position of the thigh region of the passenger on the seat cushion is more outward in a vehicle width direction, the blowing direction changing portion changes the blowing direction from pointing inward to pointing upward at the vehicle seat.

10. The vehicle seat air-conditioning device of claim 9, further comprising:
a plurality of weight sensors disposed in the seat cushion in a line in the vehicle width direction that detect weights from the passenger side, wherein
the controller is programmed to determine the thigh region to be more outward in the vehicle width direction as the weight sensors detect a weight, which is at or above a predetermined threshold weight, exists outward in the vehicle width direction.

11. The vehicle seat air-conditioning device of claim 10, wherein
the seat cushion includes a seat pad having elasticity, a seat cover that covers a surface of the passenger side of the seat pad, and cover joining portions formed as a pair lined up in the vehicle width direction, the cover joining portions joining the seat cover to the seat pad, and
all or a portion of the plurality of weight sensors are disposed in seat peripheral portions, the seat peripheral portions being formed in the seat cushion outward of each of the pair of cover joining portions in the vehicle width direction.

12. The vehicle seat air-conditioning device of claim 9, further comprising:
a memory storing a blowing direction map representing a predetermined relationship between the blowing direction and the position of the thigh region of the passenger, wherein
the controller reads the blowing direction map so as to control the blowing direction changing portion.

13. A vehicle seat air-conditioning device, comprising:
a ventilator that blows air;
an air blowout portion that is open so as to blow out the air blown by the ventilator toward a passenger sitting in a vehicle seat;
a blowing direction changing portion disposed in the air blowout portion, the blowing direction changing portion changing a blowing direction of the air blown out from the air blowout portion; and
a controller that causes the blowing direction changing portion to change the blowing direction based on passenger information, the passenger information representing a body weight of the passenger and a position of a thigh region of the passenger with respect to the vehicle seat, wherein
the vehicle seat includes a seat cushion, the seat cushion including a passenger support portion that supports the passenger,
the air blowout portion opens around the passenger support portion of the seat cushion at a passenger side thereof, and
the controller is programmed to:
acquire the passenger information to detect the body weight of the passenger and a position of the thigh region of the passenger on the seat cushion; and
control the blowing direction changing portion such that as the position of the thigh region of the passenger on the seat cushion is more outward in a vehicle width direction, the blowing direction changing portion changes the blowing direction from pointing inward to pointing upward at the vehicle seat, and as the body weight of the passenger increases, the blowing direction changing portion changes the blowing direction from pointing inward to pointing upward.

14. The vehicle seat air-conditioning device of claim 13, further comprising:
a memory storing a blowing direction map representing a predetermined relationship between the blowing direction, the body weight of the passenger and the position of the thigh region of the passenger, wherein
the controller reads the blowing direction map so as to control the blowing direction changing portion.

* * * * *